United States Patent
Chang

(10) Patent No.: US 10,112,672 B2
(45) Date of Patent: Oct. 30, 2018

(54) FRAME MECHANISM FOR A VEHICLE WITH AT LEAST THREE WHEELS

(71) Applicant: Fu-Long Chang, Chiayi (TW)

(72) Inventor: Fu-Long Chang, Chiayi (TW)

( * ) Notice: Subject to any disclaimer, the term of this patent is extended or adjusted under 35 U.S.C. 154(b) by 0 days.

(21) Appl. No.: 15/939,529

(22) Filed: Mar. 29, 2018

(65) Prior Publication Data

US 2018/0281888 A1    Oct. 4, 2018

(30) Foreign Application Priority Data

Mar. 31, 2017    (CN) .......................... 2017 1 0231762

(51) Int. Cl.
*B62K 5/10*    (2013.01)
*B62K 25/12*    (2006.01)
*B62K 5/06*    (2006.01)
*B62K 21/04*    (2006.01)
*B62K 5/00*    (2013.01)

(52) U.S. Cl.
CPC .................. *B62K 5/10* (2013.01); *B62K 5/06* (2013.01); *B62K 21/04* (2013.01); *B62K 25/12* (2013.01); *B62K 2005/001* (2013.01)

(58) Field of Classification Search
CPC . B62K 5/10; B62K 21/04; B62K 5/06; B62K 25/12; B62K 2005/001
USPC ........................................................ 280/286
See application file for complete search history.

(56) References Cited

U.S. PATENT DOCUMENTS

| 2,259,987 | A | * | 10/1941 | Bailie | ..................... A63G 19/10 |
| | | | | | 188/24.11 |
| 4,375,293 | A | * | 3/1983 | Solbes | ..................... B62B 19/00 |
| | | | | | 280/124.127 |
| 5,236,060 | A | * | 8/1993 | Huber | .................. B62D 61/065 |
| | | | | | 180/210 |
| 2002/0190494 | A1 | * | 12/2002 | Cocco | .................. B60G 21/007 |
| | | | | | 280/124.135 |
| 2014/0238764 | A1 | * | 8/2014 | Tsujii | ....................... B62M 7/12 |
| | | | | | 180/216 |

* cited by examiner

*Primary Examiner* — Anne Marie M Boehler
*Assistant Examiner* — Felicia L. Brittman
(74) *Attorney, Agent, or Firm* — Burris Law, PLLC

(57) ABSTRACT

A frame mechanism for a vehicle with at least three wheels includes wheel frame assemblies to support a vehicle frame assembly. By a shock absorbing assembly, a swing arm, two synchronizing levers and two linking shafts, when any kind of loading carried and external forces are applied to the vehicle, the wheels can constantly remain on the ground surface with the same traction so as to minimize the risk of yaw, drift and unbalance upon a turn or braking of the vehicle. Also, a variety of uneven movements of the wheels can be balanced and converted into a movement of the vehicle frame assembly in an up-and-down direction. In case of the wheels running off the ground, the wheels can be kept in a proper position for retouching down with safety and comfort.

10 Claims, 9 Drawing Sheets

FRAME MECHANISM FOR A VEHICLE WITH AT LEAST THREE WHEELS

CROSS-REFERENCE TO RELATED APPLICATION

This application claims priority of Chinese Patent Application No. 201710231762.6, filed on Mar. 31, 2017.

FIELD

The disclosure relates to a frame mechanism of a vehicle, and more particularly to a frame mechanism for a vehicle with at least three wheels.

BACKGROUND

A conventional two wheeler, like a bicycle with two wheels arranged in a line, tends to sideslip when making a sharp turn, to drift during braking, and to lose balance and yaw when the two wheeler is initially started or moves slowly, thereby imposing potential danger to the rider. With two wheels mounted on one axle, a conventional three or four wheeler is more stable at a lower speed but it lacks dynamic movability and is hence unable to tilt while needed. Therefore, a frame mechanism is desired to eliminate those drawbacks mentioned above.

SUMMARY

Therefore, an object of the disclosure is to provide a frame mechanism for a vehicle with at least three wheels that has superior control ability, movability, steadiness and safety.

According to the disclosure, the frame mechanism for a vehicle includes a vehicle frame assembly, a first wheel frame assembly and a second wheel frame assembly. The first wheel frame assembly includes a first wheel frame unit, a swing arm, two synchronizing levers, two first wheels and two linking shafts. The first wheel frame unit has a fork assembly connected to the vehicle frame assembly, and a shock absorbing assembly connected to the fork assembly. The swing arm has a swiveling center pivotably connected to the shock absorbing assembly such that left and right ends of the swing arm are swingable around the swiveling center and movable together with the shock absorbing assembly in an up-and-down direction. The synchronizing levers are respectively arranged at left and right sides of the fork assembly and below the swing arm. Each of the synchronizing levers has a pivot end journalled on the first wheel frame unit, and a transmitting end opposite to the pivot end in a front-and-rear direction. Each of the first wheels is journalled on the transmitting end of a respective one of the synchronizing levers. Each of the linking shafts has an upper pivot end pivoted to a respective one of the left and right ends of the swing arm, and a lower pivot end pivoted to a respective one of the synchronizing levers so as to transmit movement of the respective synchronizing lever to the swing arm. The second wheel frame assembly includes a second wheel frame unit which is connected to the vehicle frame assembly and which is spaced apart from the first wheel frame unit in the front-and-rear direction, and at least one second wheel which is journalled on the second wheel frame unit to cooperate with the first wheels to support the vehicle frame assembly.

With the swing arm, the shock absorbing assembly and the synchronizing levers, the impact force exerted to the first wheel frame assembly can be absorbed and evenly distributed to the two first wheels. Also, a variety of uneven movements of the two first wheels can be balanced and converted into a movement of the vehicle frame assembly in the up-and-down direction. Thus, in case of the first wheels running off the ground, the first wheels can be kept in a proper position for retouching down with safety.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
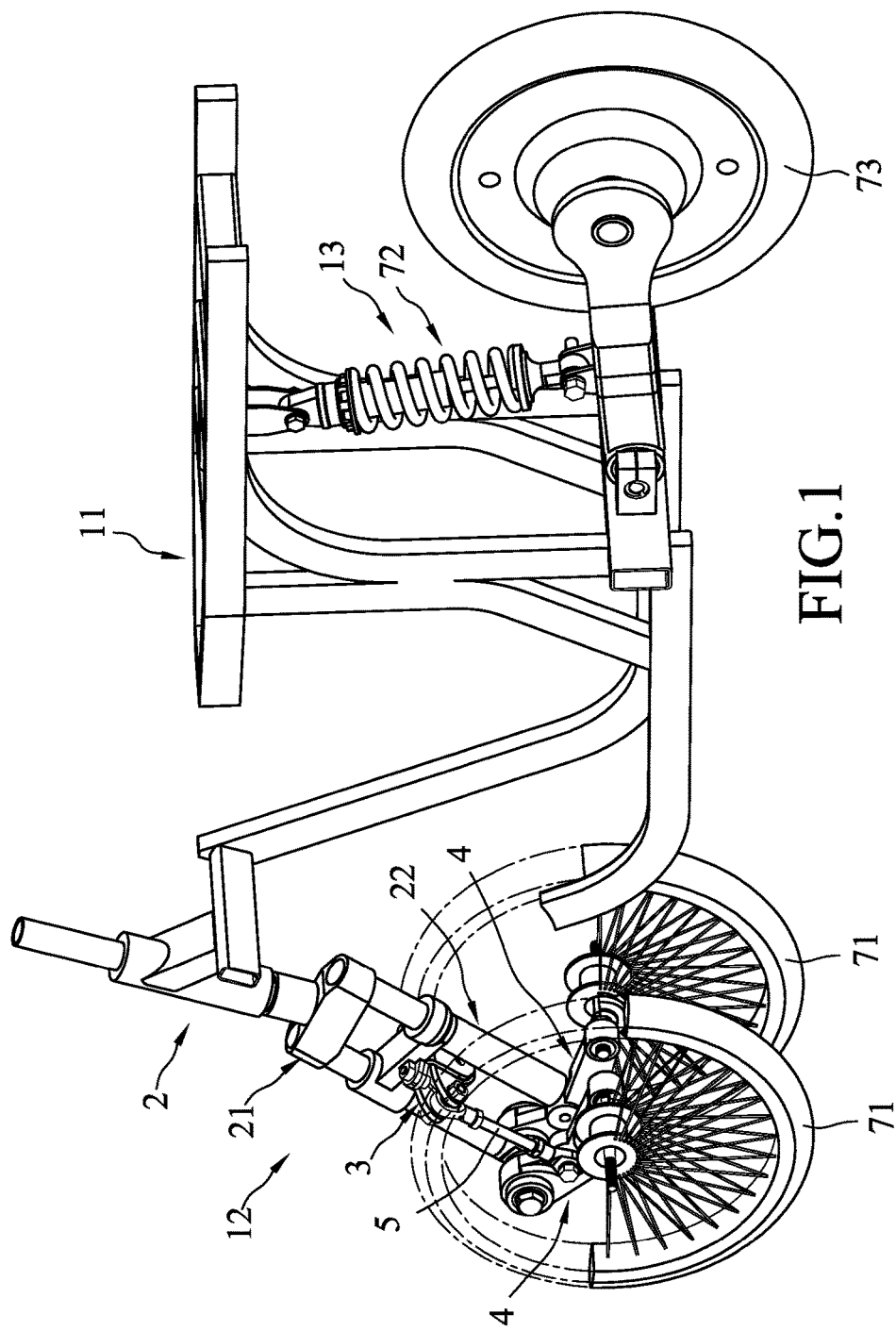
FIG. 1 is a fragmentary perspective view illustrating a first embodiment of a frame mechanism for a vehicle with at least three wheels according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
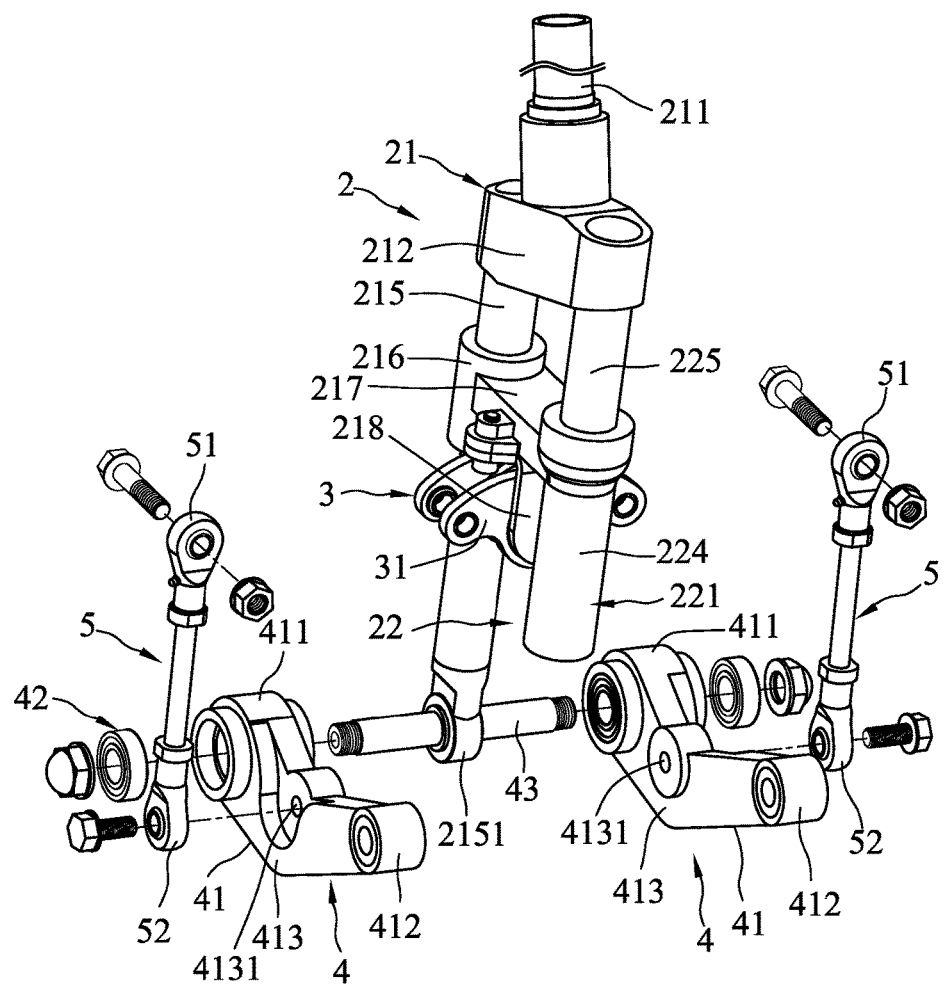
FIG. 2 is a fragmentary exploded perspective view illustrating a portion of the first embodiment.

Referring to FIGS. 1 and 2, a first embodiment of a frame mechanism for a vehicle with at least three wheels includes a vehicle frame assembly 11, a first wheel frame assembly 12 and a second wheel frame assembly 13. In this embodiment, the first and second wheel frame assemblies 12, 13 are mounted at front and rear ends of the vehicle frame assembly 11, respectively.

The first wheel frame assembly 12 includes a first wheel frame unit 2, a swing arm 31, two synchronizing levers 4, two first wheels 71 and two linking shafts 5.

The first wheel frame unit 2 has a fork assembly 21 pivotably connected to the vehicle frame assembly 11, and a shock absorbing assembly 22 connected to the fork assembly 21.

In one embodiment, the fork assembly 21 includes a head tube 211 which is pivotably connected to a head of the vehicle frame assembly 11, a fork crown 212 which is connected to the head tube 211 at an upper center thereof, and which has front and rear portions opposite to each other in a front-and-rear direction, a column 215 which extends downwardly from the front portion of the fork crown 212 to terminate at a connected end 2151 that the synchronizing levers 4 are journalled on (as described later), and a bushing 216 which is movably sleeved on the column 215 in an up-and-down direction. The bushing 216 has an extending bridge 217 which extends rearwardly to connect with the shock absorbing assembly 22. The extending bridge 217 has a bracket 218 which is securely disposed on a central bottom thereof and interposed between the column 215 and the shock absorbing assembly 22. The swing arm 31 is pivotably mounted on the bracket 218.

The shock absorbing assembly 22 includes a damping member 221 which is mounted on the rear portion of the fork crown 212. In one embodiment, the damping member 221 may be a common one used in a front fork of a motorcycle, and has a cylinder 224 with a shock resisting and damping element received therein, and a piston 225 connected to the rear portion of the fork crown 212 and reciprocally moved in the cylinder 224 with a proper designed stroke. In other modified embodiments, the damping member 221 may be in the form of a hydraulic type, a pneumatic type, a spring type, etc.

The swing arm 31 has two wings that extend symmetrically in a left-and-right direction, and a swiveling center that is pivoted to the bracket 218. The left and right ends of the swing arm 31 equally extend from the swiveling center. Thus, the swing arm 31 is swingable around the swiveling center and is also movable together with the shock absorbing assembly 22 in the up-and-down direction so as to simultaneously achieve both wheel movement balancing and shock absorbing functions.

The synchronizing levers 4 are located at left and right sides of the fork assembly 21 and below the swing arm 31. Each of the synchronizing levers 4 has a lever body 41 which has a pivot end 411 that is journalled on the connected end 2151 of the column 215 through an axle shaft 43 that is secured to the connected end 2151, and a bearing unit 42. The lever body 41 further has a transmitting end 412 on which a respective one of the first wheels 71 is journalled, and a center lever portion 413 which is disposed between the pivot end 411 and the transmitting end 412 and formed with a hole 4131 such that a lower pivot end 52 of a respective one of the linking shafts 5 is pivoted thereto.

Each of the linking shafts 5 is a straight shaft, and has an upper pivot end 51 that is pivoted to the respective end of the swing arm 31, and the lower pivot end 52 that is pivoted to the center lever portion 413 of the respective synchronizing lever 4 so as to transmit movement of the respective synchronizing lever 4 to the swing arm 31. The upper and lower pivot ends 51, 52 may be also in the form of a common universal joint, such as rubber bushings utilized in a motorcycle or a vehicle chassis.

The second wheel frame assembly 13 includes a second wheel frame unit 72 which is pivotably connected to the vehicle frame assembly 11 and which is spaced apart from the first wheel frame unit 2 in the front-and-rear direction, and at least one second wheel 73 which is journalled on the second wheel frame unit 72 to cooperate with the first wheels 71 to support the vehicle frame assembly 11.

When one of the first wheels 71 rolls over an obstacle and hence moves upward or downward, the transmitting end 412 and the center lever portion 413 of the corresponding lever body 41 are forced to swing about the axle shaft 43 in the upper-and-lower direction with the axle shaft 43 so as to move the corresponding linking shaft 5 in the same direction and thus move the swing arm 31, the bracket 218, the extending bridge 217, the bushing 216 and the cylinder 224. Hence, all impact forces exerted to the first wheels 71 are transmitted to the extending bridge 217, and are jointed and absorbed by the shock absorbing assembly 22.

Since the left and right ends of the swing arm 31 are symmetrically distant from the swiveling center by the same length, the vehicle loading transmitted from the head tube 211 and applied to the fork assembly 21 can be constantly and evenly distributed to the two first wheels 71 through the swing arm 31, the linking shafts 5 and the synchronizing levers 4. On the other hand, the external force exerted onto either one of the first wheels 71 can be equally transmitted to the other one of the first wheels 71 through the swing arm 31. Hence, when any kind of loading carried and external forces are applied to the vehicle, the two first wheels 71 can constantly remain on the ground surface with the same traction so as to minimize the risk of yaw, drift and unbalance up on a turn or braking of the vehicle.

Moreover, in this embodiment, the column 215 and the damping member 221 are spacedly arranged in the front-and-rear direction to reduce the distance between the first wheels 71 so as to render the vehicle narrower in a width and more compact.

Figure 3:
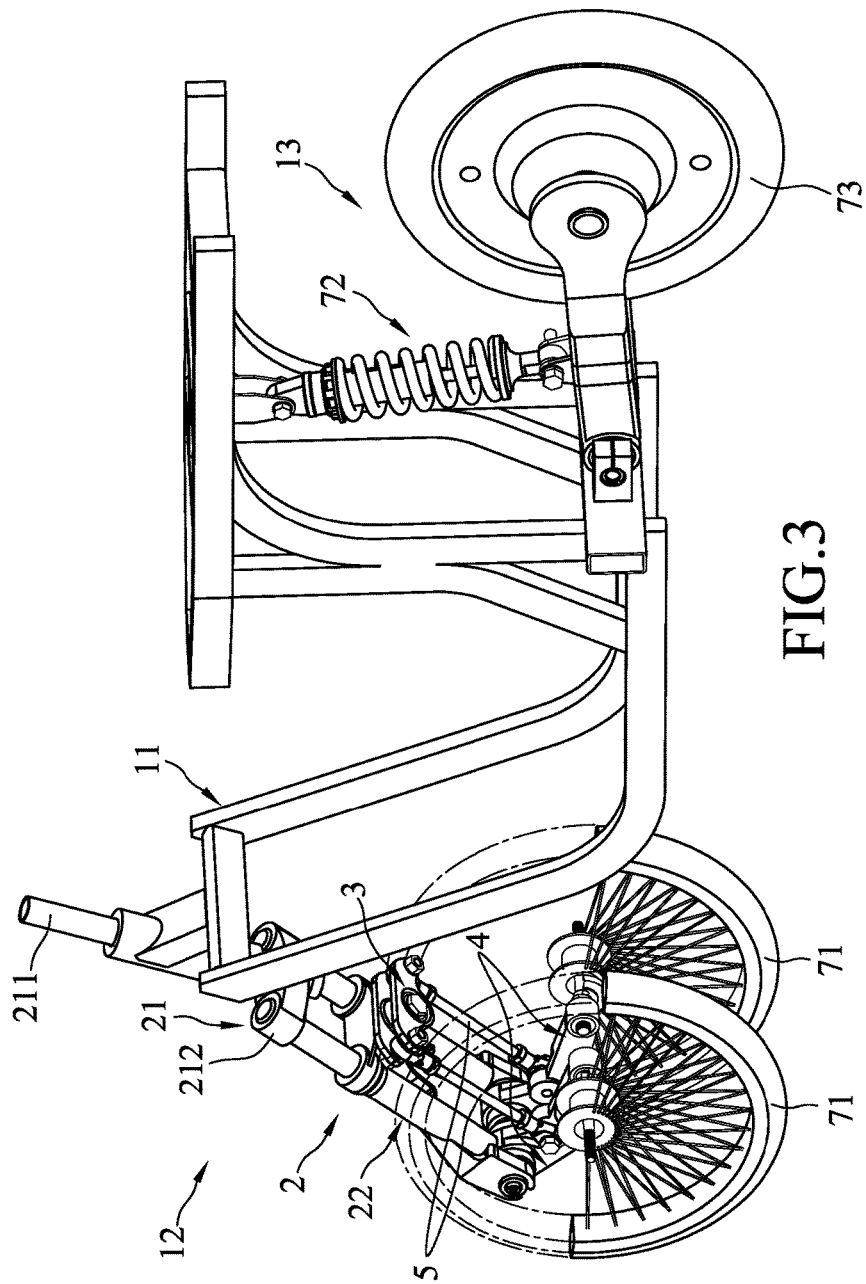
FIG. 3 is a fragmentary perspective view illustrating a second embodiment of the frame mechanism according to the disclosure.
Figure 4:
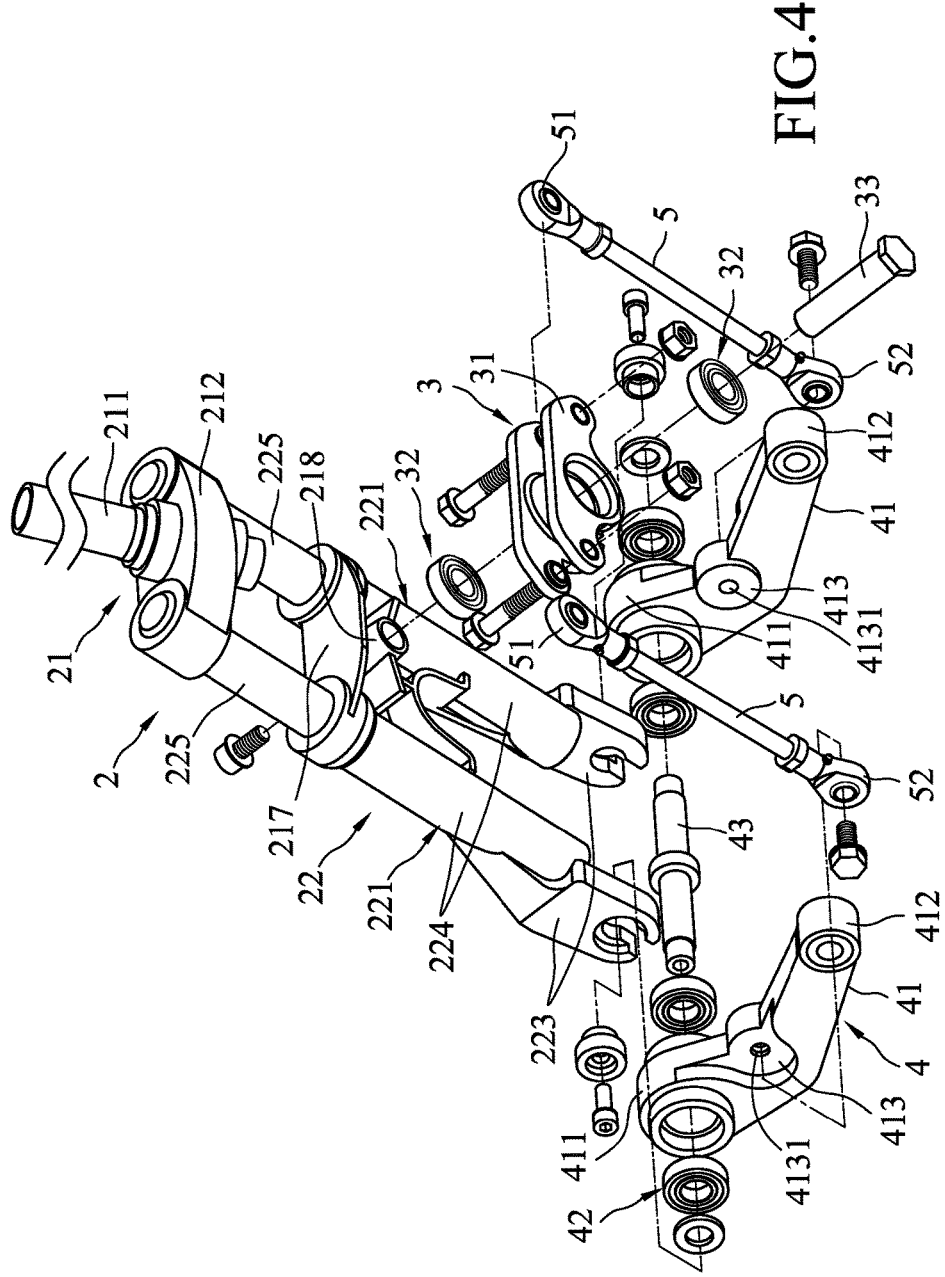
FIG. 4 is a fragmentary exploded perspective view illustrating a portion of the second embodiment.

With reference to FIGS. 3 and 4, in a second embodiment, the fork crown 212 of the fork assembly 21 extends in the left-and-right direction to have left and right portions. The shock absorbing assembly 22 includes two damping members 221 which, at upper ends thereof, are connected to the left and right portions of the fork crown 212, respectively, and two mounting brackets 223 which are respectively connected to the cylinders 224 of the damping members 221. The extending bridge 217 is disposed to interconnect the cylinders 224 to be moved together with the cylinders 224. The swing arm 31 is pivotably mounted on the bracket 218 through a pair of bearings 32 on an axle shaft 33 that is threadedly fixed through a hole in the center of the bracket 218.

Each lever body 41 has the pivot end 411 that is journalled on the respective mounting bracket 223 through an axle shaft 43 which is threadedly fixed onto the respective mounting bracket 223. The operation and effect of the lever bodies 41 and the swing arm 31 are similar to those in the previous embodiment. Further, by setting different values of distances between either one of the pivot and the transmitting ends 411, 412 and the center lever hole 4131, an appropriate ratio of lever can be achieved to match the shock absorbing assembly 22 and to reduce the swiveling range of the swing arm 31 so as to reduce the space occupied by the two damping members 221.

Figure 5:
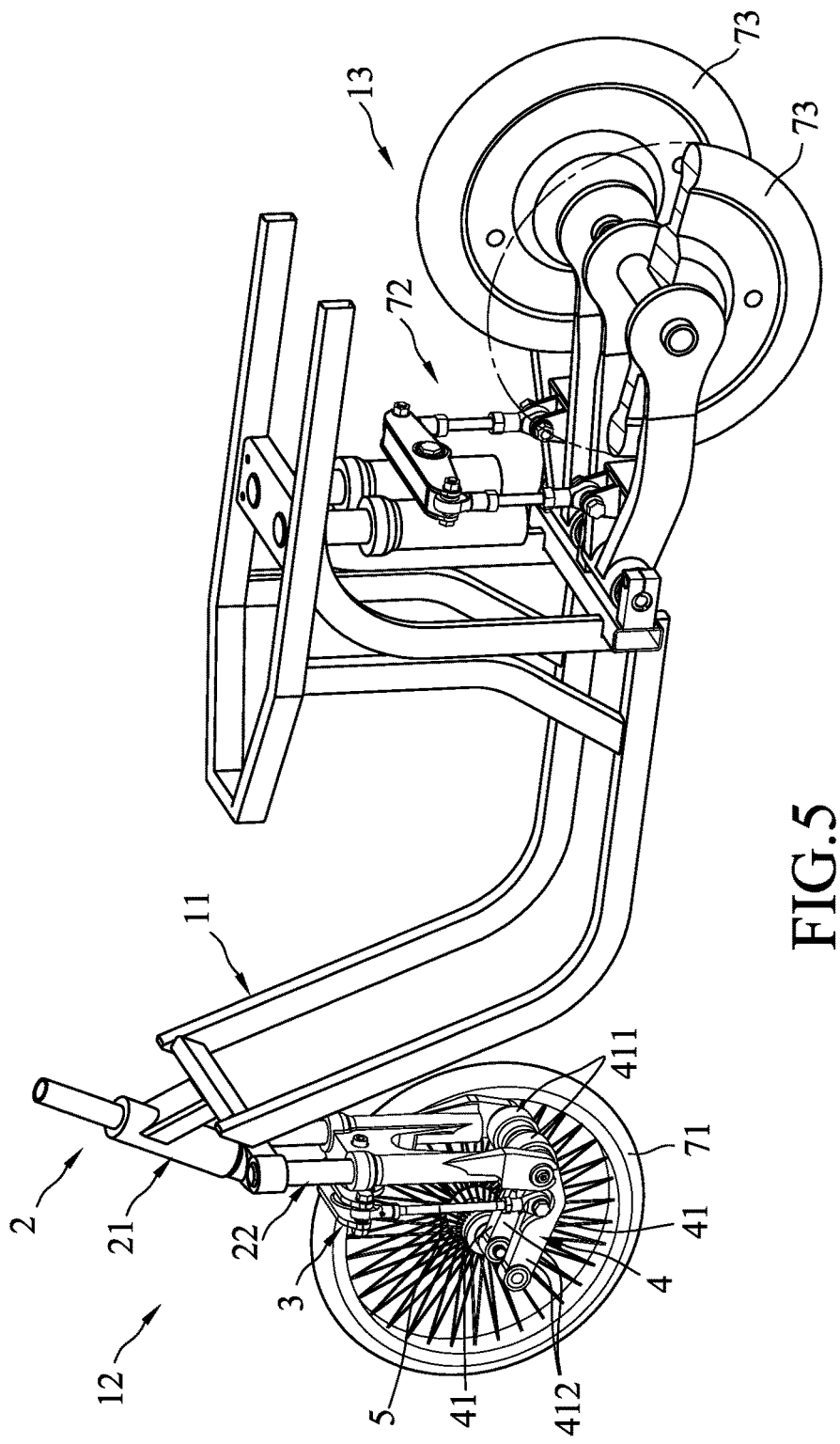
FIG. 5 is a fragmentary perspective view illustrating a third embodiment of the frame mechanism according to the disclosure, only one first wheel at front being shown.

With reference to FIG. 5, in a third embodiment, the transmitting end 412 of each lever body 41, on which the respective first wheel 71 is journalled, is disposed forwardly of the pivot end 411.

Figure 6:
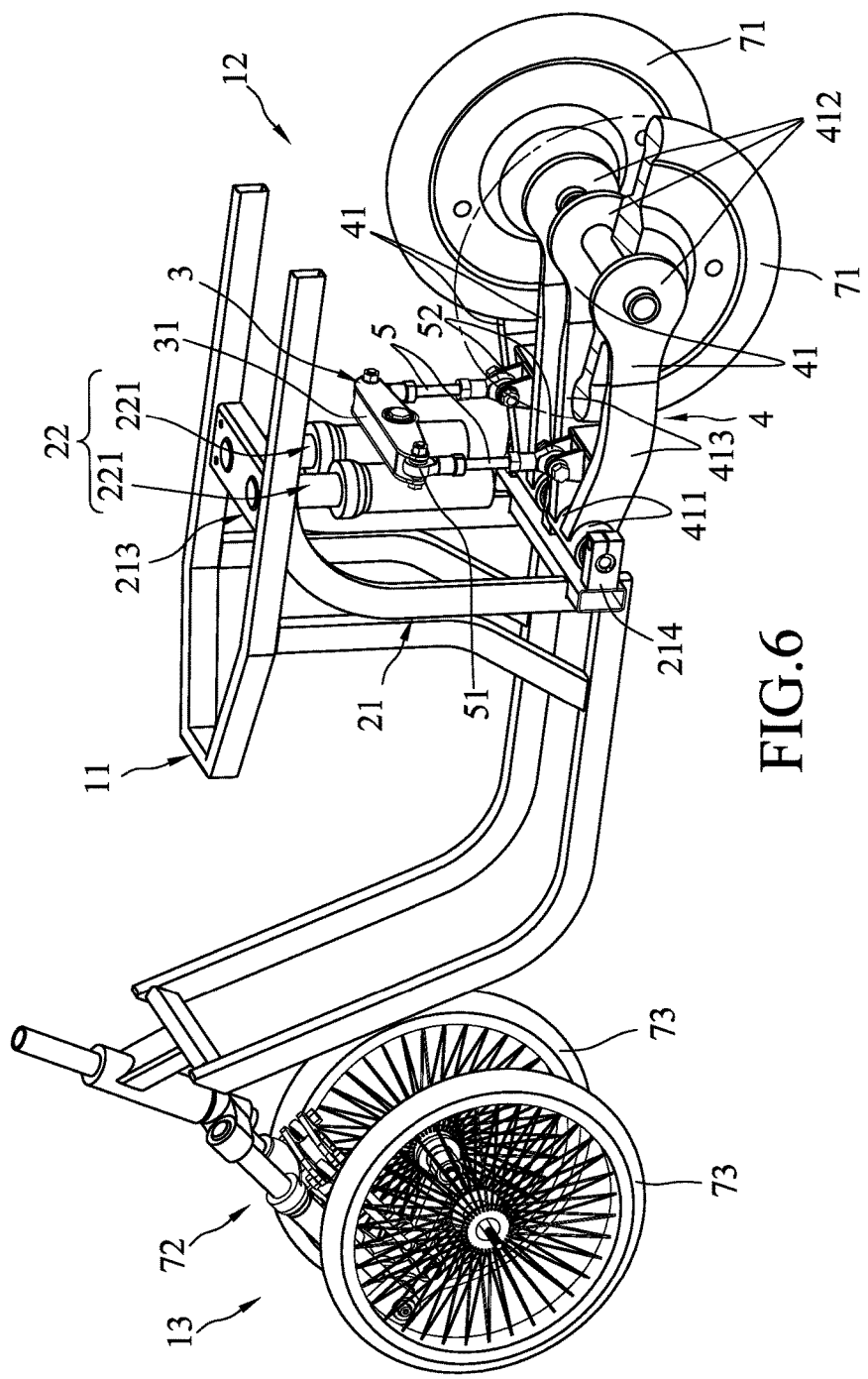
FIG. 6 is a fragmentary perspective view illustrating a fourth embodiment of the frame mechanism according to the disclosure.
Figure 7:
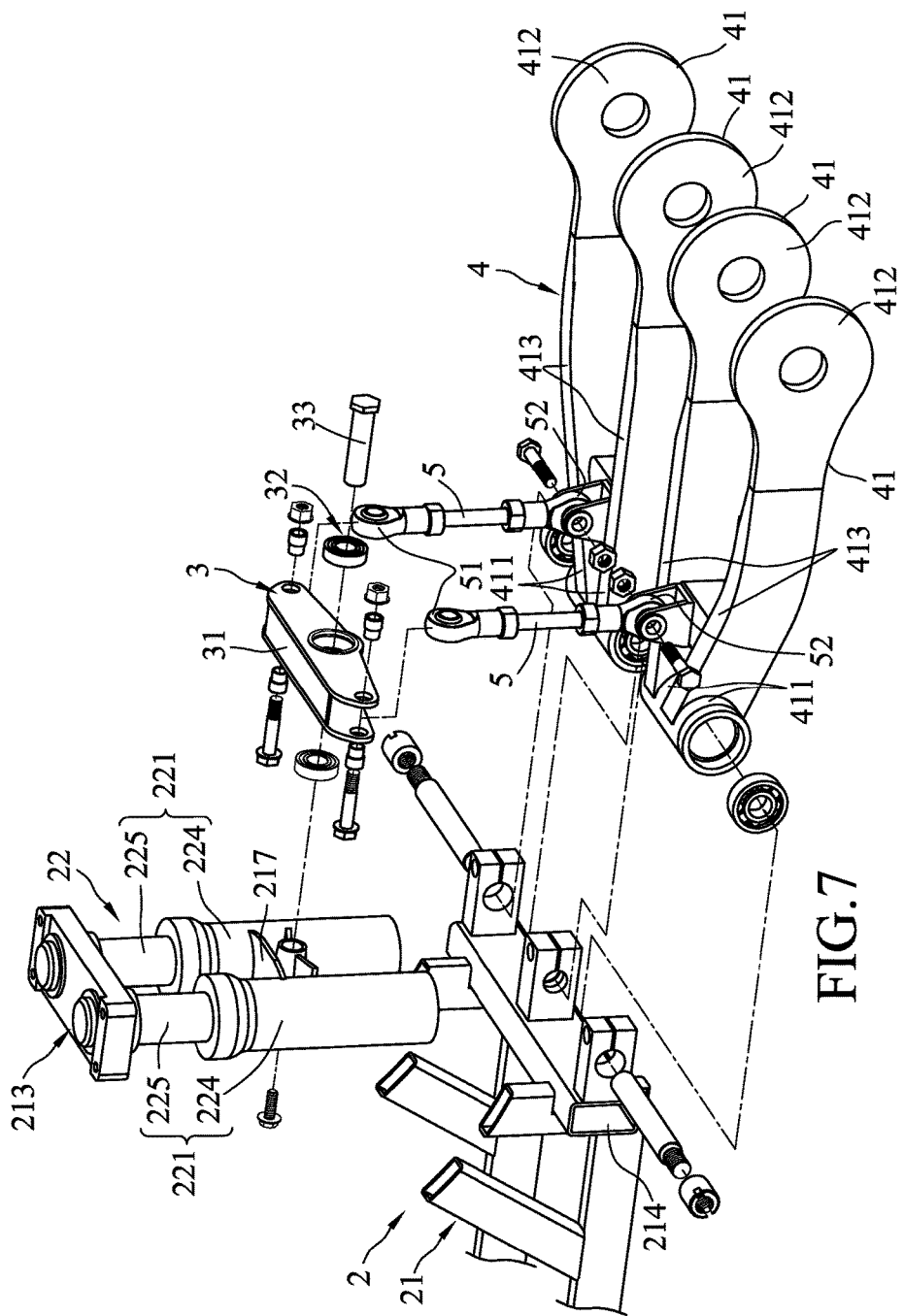
FIG. 7 is a fragmentary exploded perspective view illustrating a portion of the fourth embodiment.

With reference to FIGS. 6 and 7, in a fourth embodiment, the first and second wheel frame assemblies 12, 13 are mounted at rear and front ends of the vehicle frame assembly 11, respectively. The fork assembly 21 has a rear fork crown 213 securely mounted on the vehicle frame assembly 11 at an appropriate position to firmly hold the pistons 225, and a transverse shaft 214 disposed below the fork crown 213 and firmly connected to the vehicle frame assembly 11. The synchronizing levers 4 may be utilized in a single fork type or a double fork type of a conventional bicycle or motorcycle. For example, as shown in FIGS. 6 and 7, each of the synchronizing levers 4 has two lever bodies 41 which are jointed at the pivot ends 411 thereof and formed in a V shape configuration. The pivot ends 411 of the lever bodies 41 are coaxially journalled on the transverse shaft 214. On the transmitting end 412 of each lever body 41, one of the first wheels 71 is journalled. The center lever portions 413 of the lever bodies 41 are connected to the lower pivot end 52 of the corresponding linking shaft 5.

Figure 8:
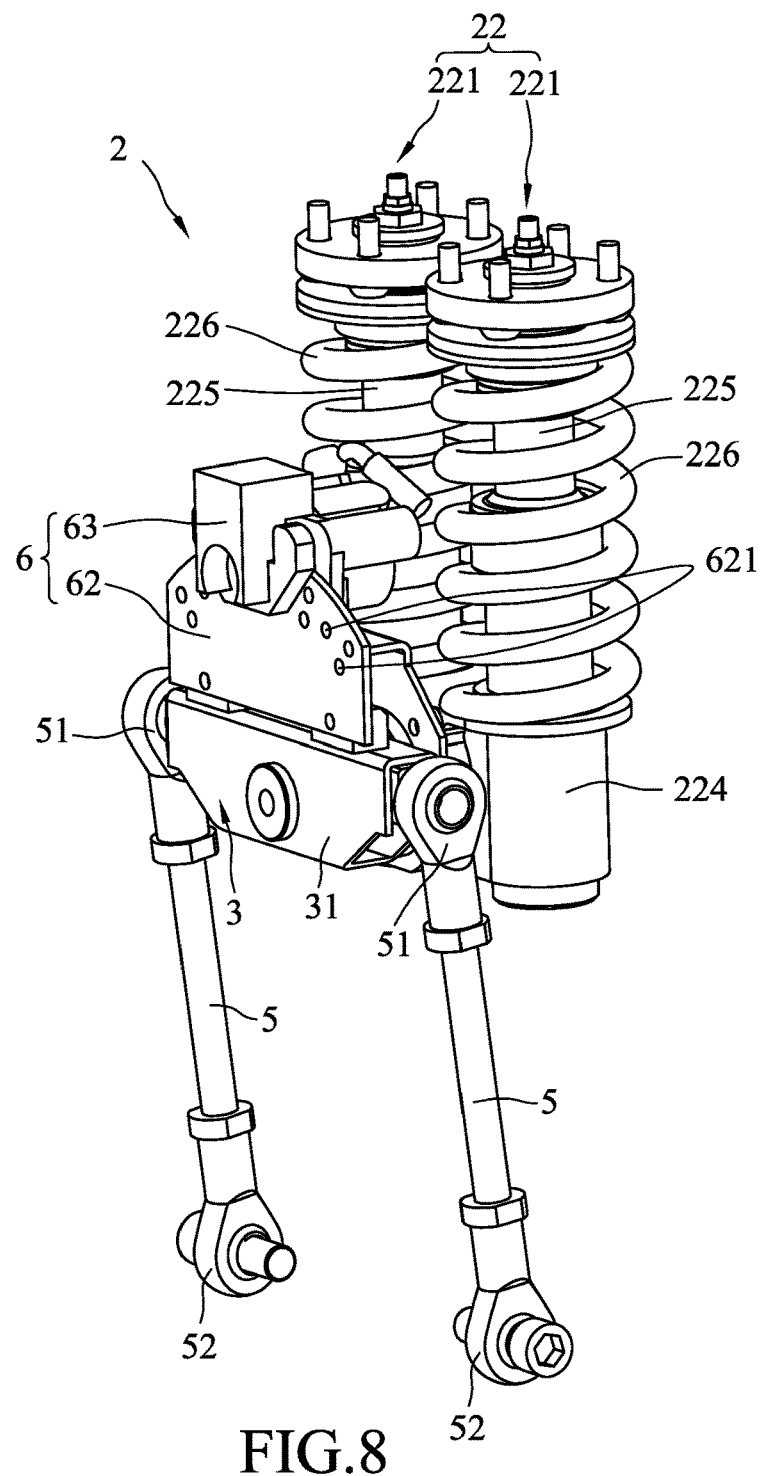
FIG. 8 is a perspective view illustrating a portion of a fifth embodiment of the frame mechanism according to the disclosure.
Figure 9:
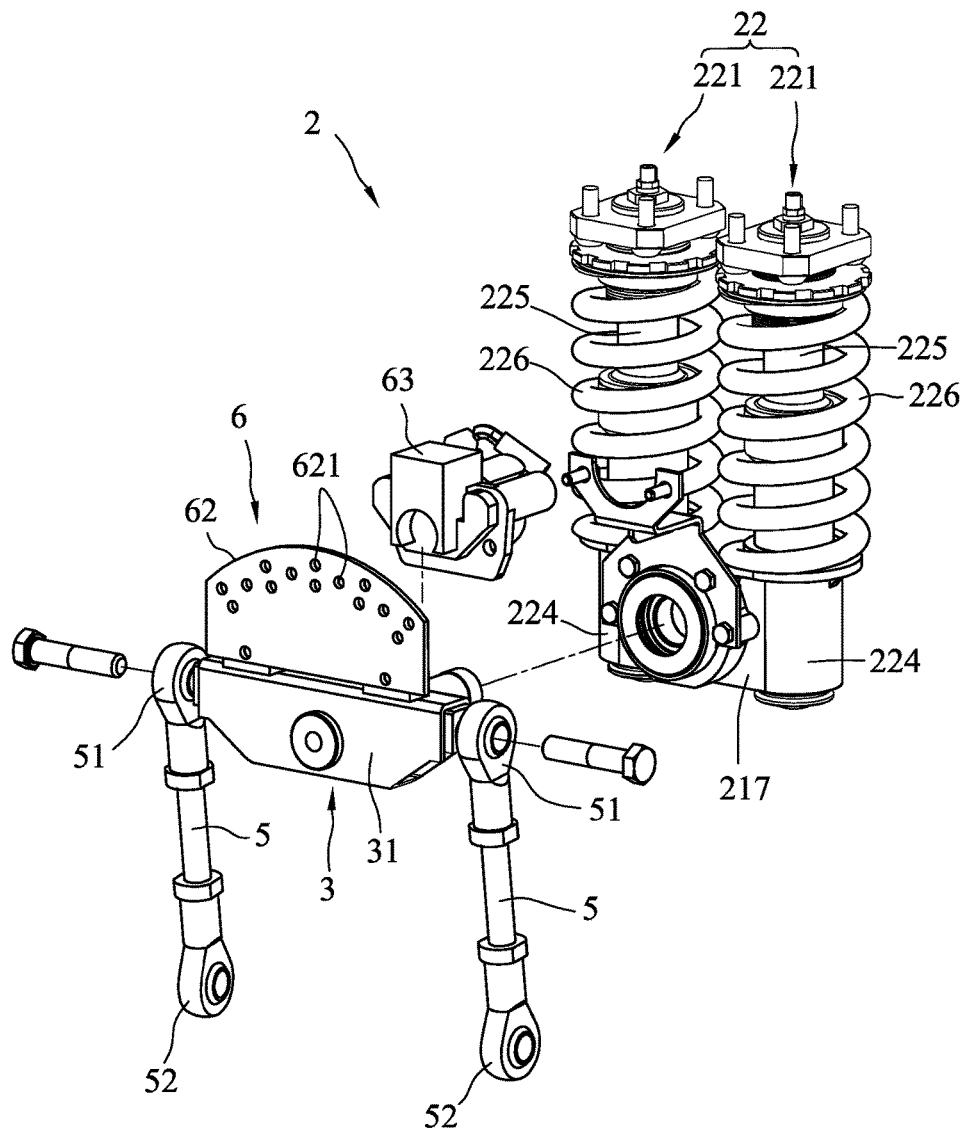
FIG. 9 is an exploded perspective view illustrating the portion of the fifth embodiment.

With reference to FIGS. 8 and 9, in a fifth embodiment, each damping member 221 further has a coil spring 226 sleeved around the piston 225 and connected between the cylinder 224 and the piston 225 so as to increase the shock absorbing force of the shock absorbing assembly 22. The first wheel frame unit 2 further has an arresting assembly 6. The arresting assembly 6 has a brake disc 62 which is securely mounted on the swing arm 31 to be moved therewith, and a caliper 63 which is securely mounted on the extending bridge 217 and controlled to clamp the brake disc 62 to immobilize swinging of the swing arm 31. The two synchronizing levers 4 can be arrested through the linking shafts 5 so as to prevent relative movement of the first wheels 71. Hence, when the arresting assembly 6 is controlled to brake the two synchronizing levers 4, the relative movement between the two wheels 71 is arrested and thus the vehicle can be supported by the non-relatively-moving rear wheels 71 and a front wheel as a conventional tricycle, which renders the vehicle steady and not prone to sideslip during parking or moving slowly.

Alternatively, the brake disc 62 may have a plurality of locking holes 621 to facilitate engagement of a locking device (not shown) in a selected locking hole 621 to immobilize the swing of the swing arm 31 so as to brake the brake disc 62.

Alternatively, in modified embodiments, each damping member 221 may be disposed inversely. For example, the cylinder 224 may be disposed at an upper portion and the piston 225 may be disposed at a lower portion. The bearing units 32, 42 may be in the form of a ball bearing, a bushing-type sliding bearing, etc. The vehicle may have component parts connected to one another in a permanently securing manner, such as welding or the like, or by means of fastening units, such as rivets, fasteners, etc. The swing arm 31 may be pivoted to the extending bridge 217 through the bearing unit 32 that is received in a hole of the swing arm 31, as shown in FIG. 4. Alternatively, the swing arm 31 may be pivoted through a bearing unit disposed outwardly of the swing arm 31.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A frame mechanism for a vehicle with at least three wheels, comprising:

a vehicle frame assembly;
a first wheel frame assembly including
a first wheel frame unit which has a fork assembly that is connected to said vehicle frame assembly, and a shock absorbing assembly that is connected to said fork assembly,
a swing arm which has a swiveling center that is pivotably connected to said shock absorbing assembly such that left and right ends of said swing arm are swingable around said swiveling center and movable together with said shock absorbing assembly in an up-and-down direction,
two synchronizing levers which are located at left and right sides of said fork assembly and below said swing arm, each of said synchronizing levers having a pivot end that is journalled on said first wheel frame unit, and a transmitting end that is opposite to said pivot end in a front-and-rear direction,
two first wheels, each of which is journalled on said transmitting end of a respective one of said synchronizing levers, and
two linking shafts, each of which has an upper pivot end that is pivoted to a respective one of said left and right ends of said swing arm, and a lower pivot end that is pivoted to a respective one of said synchronizing levers so as to transmit movement of said respective synchronizing lever to said swing arm; and
a second wheel frame assembly including a second wheel frame unit which is connected to said vehicle frame assembly and which is spaced apart from said first wheel frame unit in the front-and-rear direction, and at least one second wheel which is journalled on said second wheel frame unit to cooperate with said first wheels to support said vehicle frame assembly.

2. The frame mechanism as claimed in claim 1, wherein said shock absorbing assembly includes two damping members which are spaced apart from each other, said fork assembly having an extending bridge which interconnects said damping members and on which said swing arm is pivotably mounted, each of said damping members having a cylinder and a piston reciprocally movable in said cylinder.

3. The frame mechanism as claimed in claim 2, wherein said swing arm extends in a left-and-right direction to have said swiveling center pivoted to said extending bridge, and said left and right ends pivotably connected to said upper pivot ends of said linking shafts, respectively.

4. The frame mechanism as claimed in claim 3, wherein said damping members are spacedly arranged in the left-and-right direction, said shock absorbing assembly further including two mounting brackets which are respectively and securely connected to said cylinders, each of said synchronizing levers having a lever body which has said pivot end journalled on a respective one of said mounting brackets, and said transmitting end that a respective one of said first wheels is journalled on.

5. The frame mechanism as claimed in claim 4, wherein said lever body has a center lever portion which is disposed between said pivot end and said transmitting end and to which said lower pivot end of said respective linking shaft is pivoted.

6. The frame mechanism as claimed in claim 3, wherein each of said synchronizing levers has two lever bodies each having said pivot end which is journalled on said fork assembly, said transmitting end on which one of said first wheels is journalled, and a center lever portion which is disposed between said pivot end and said transmitting end and to which said lower pivot end of a corresponding one of said linking shafts is pivoted.

7. The frame mechanism as claimed in claim 3, wherein said first wheel frame unit has an arresting assembly having a brake disc which is mounted on said swing arm, and a caliper which is mounted on said extending bridge and which is controlled to clamp said brake disc to immobilize swinging of said swing arm.

8. The frame mechanism as claimed in claim 7, wherein said brake disc has a plurality of locking holes.

9. The frame mechanism as claimed in claim 7, wherein each of said damping members has a coil spring which is connected between said cylinder and said piston.

10. The frame mechanism as claimed in claim 1, wherein said fork assembly has a fork crown which is pivoted to said vehicle frame assembly and which has front and rear portions, a column which extends downwardly from said front portion of said fork crown to terminate at a connected end that said pivot ends of said synchronizing levers are journalled on, and a bushing which is movably sleeved on said column, said bushing having an extending bridge which extends rearwardly to connect with said shock absorbing assembly, said shock absorbing assembly including a damping member which is mounted on said rear portion of said fork crown and which extends in the upper-and-lower direction, said swing arm being pivotably mounted to said extending bridge and between said column and said shock absorbing assembly.

\* \* \* \* \*